UNITED STATES PATENT OFFICE.

KARL REINKING, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

DISCHARGING PASTE.

No. 871,629.  Specification of Letters Patent.  Patented Nov. 19, 1907.

Application filed February 1, 1905. Serial No. 243,747.

*To all whom it may concern:*

Be it known that I, KARL REINKING, doctor of philosophy and chemist, a subject of the Prince Regent of Brunswick, residing at Ludwigshafen-on-the Rhine, in the Kingdom of Bavaria, German Empire, have invented new and useful Improvements in Discharging Pastes, of which the following is a specification.

In the specification of Letters Patent No. 744,501 there is described the preparation of discharging pastes containing hydrosulfites. These pastes, however, leave much to be desired with regard to their stability. I have now discovered that discharging pastes which are much more stable and which also possess an excellent discharging power can be obtained if in the preparation thereof water be entirely, or almost entirely, excluded. This can be effected in the first place by employing, instead of the usual thickening, in the preparation of which water has been used, a thickening containing no water, or practically no water, prepared by mixing the usual thickening agent (such, for instance, as starch, burnt starch, and dextrin) with an organic liquid, for example, glycerin, which has the power of dissolving dextrin, or of causing the different kinds of starch to swell, and in the second place in making use either of dry anhydrous hydrosulfite, or of a paste of such hydrosulfite containing no water.

The organic liquid which I have found most suitable for the purposes of my invention is glycerin and especially crude glycerin on account of its cheapness.

An advantage of my invention is that, when producing colored discharges, the coloring matter and its fixing agent can also be dissolved in the glycerin. The other additions to the discharging pastes which are described in the specification of Letters Patent No. 744,501 can also be made to these new pastes if desired.

The following examples will serve to further illustrate the nature of this invention, which, however, is not confined to these examples. The parts are by weight.

*Example of the preparation of a thickening.*—Boil together for ten (10) minutes three (3) parts of wheat starch, nine (9) parts of dextrin and forty-eight (48) parts of crude glycerin.

*Examples of the preparation of discharging pastes.*—(a) Stir well together, to a fine paste, forty-two (42) parts of a zinc-sodium double salt of hydrosulfurous acid in powder, eighteen (18) parts of crude glycerin (of twenty-eight (28) degrees Baumé) and forty (40) parts of glycerin thickening prepared according to the foregoing example. Print this onto the material, dry, steam for three (3) minutes, and wash and soap.

(b) Grind together, to a fine paste, forty-four (44) parts of glycerin thickening prepared according to the foregoing example, eleven (11) parts of caustic soda solution (containing about forty-one (41) per cent. of NaOH), thirty (30) parts of powdered sodium hydrosulfite, and fifteen (15) parts of glycerin. Print this onto the material, dry, steam for four (4) minutes, and soap and wash.

Now what I claim is:

1. As a new article of manufacture a discharging paste containing an anhydrous hydrosulfite, glycerin and less than ten per cent. of water.

2. As a new article of manufacture a discharging paste containing an anhydrous hydrosulfite, glycerin, wheat starch and dextrin and less than ten per cent. of water.

3. As a new article of manufacture a discharging paste containing forty-four parts of glycerin thickening (composed of three parts of wheat-starch, nine parts of dextrin and forty-eight parts of glycerin), eleven parts of caustic soda solution (containing forty-one per cent. of NaOH), thirty parts of sodium hydrosulfite and fifteen parts of glycerin.

In testimony whereof I have hereunto set my hand in the presence of two subscribing witnesses.

KARL REINKING.

Witnesses:
J. ALEC. LLOYD,
JOS. H. LEUTE.